Patented June 21, 1938

2,121,518

UNITED STATES PATENT OFFICE 2,121,518

PROCESS OF PURIFYING PETROLATUM

Ferdinand W. Breth, New York, N. Y., and Anthony Kinsel, Petrolia, Pa., assignors to L. Sonneborn Sons, Inc., a corporation of Delaware No Drawing. Application November 21, 1935, Serial No. 50,996

8 Claims. (Cl. 196—21)

This invention relates to the purification of petrolatum.

An object of the invention is the purification, decolorization, and deodorization of petrolatum with simultaneous increase of filtration yield.

Another object is to provide a petrolatum which is resistant to discoloration when exposed to light.

It is customary to purify petrolatum by a two stage filtration; first by filtration through fuller's earth, or the like, to decolorize the petrolatum. This first stage filtration does not always remove the flavor and taste-imparting substances, for example, in dark colored petrolatums, and they are usually removed by an additional filtration through bone char, or by treatment with steam. Petrolatum is also refined by treatment with sulphuric acid, but such treatment is destructive to many of the essential constituents of the petrolatum. Petrolatums prepared by the above methods are more susceptible to discoloration upon exposure to light.

We have discovered that petrolatum can be decolorized and deodorized in a single stage filtration by passing the same in the liquid phase, for example, between 130° and 400° F., under pressure through bauxite. The bauxite may contain other compounds, such as iron compounds. We prefer to use a bauxite containing an initially high percentage of water of constitution, for example—the bauxite obtained from Arkansas, which contains about 29%–30% water of constitution; India, about 23.8%; Alabama, between 25% and 30%; Georgia, between 29.1%–33.5%, etc. Other bauxites having a lower percentage of water of constitution may be used, but they will not give as good results.

Prior to its use, the bauxite is preferably activated, for example, by heating from 600° to 1600° F., and especially between 1000° and 1200° F. Upon heating, bauxite does not sinter like other adsorbent materials, such as fuller's earth, and can be used practically indefinitely.

The following example illustrates one method of carrying out our invention, but it is to be understood that such method is given by way of illustration and not of limitation. Bauxite containing a high percentage of water of constitution, for example, one containing about 30%, and of 30 to 60 mesh, is introduced into a conventional kiln, and heated at between 1000° to 1200° F. The bauxite is then cooled to a temperature below about 300° F., and transferred to a suitable filter. Molten petrolatum from a Pennsylvania crude, at a temperature of about 250° F., is then passed through the bauxite under a pressure of about 30 pounds per square inch, and the melted petrolatum, emerging from the bottom of the filter column, is substantially free of objectionable color, odor, or taste. The yield of petrolatum, when the filtration is carried out under pressure, is up to 100% more than the yield of a filtration under similar conditions but at atmospheric pressure.

Our process does not require a second purification step which cuts down the yield and is a source of increased expense. The petrolatum filtered through the bauxite retains all of its desirable properties, and is characterized by a relatively high melting point, proper consistency, and permanent homogeneity.

Another unique advantage inherent in the use of bauxite is that upon suitable separation of the fines and the iron compounds after each successive regeneration, the regenerated bauxite maintains uniformly high efficiency practically indefinitely. In contrast, ordinary adsorbents of the fuller's earth type become exhausted after a relatively short cycle of use. The rejected fines may be used for other purposes, for example, in the manufacture of alum.

We are not to be limited to any particular type, particle size, or purity of bauxite used, to any specific method of activating the same, to any method of bringing the petrolatum into the liquid phase, nor to any specific filtration pressure, or temperature.

The foregoing description is for purposes of illustration and not of limitation, and it is, therefore, our intention that the invention be limited only by the appended claims or their equivalents, wherein we have endeavored to claim broadly all inherent novelty.

We claim:
1. The process of purifying petrolatum comprising filtering petrolatum at a temperature between 130 and 400° F. through activated bauxite under a pressure in excess of atmospheric at which the yield of petrolatum is materially in excess of the yield when the same stock is filtered at atmospheric pressure.

2. The process of purifying petrolatum comprising filtering petrolatum at about 250° F. through activated bauxite under a pressure in excess of atmospheric at which the yield of petrolatum is materially in excess of the yield when the same stock is filtered at atmospheric pressure.

3. The process of purifying petrolatum comprising heating bauxite to a temperature between 600 and 1600° F. to thereby activate the same and filtering petrolatum at a temperature between 130 and 400° F. through said activated bauxite under a pressure in excess of atmospheric at which the yield of petrolatum is materially in excess of the yield when the same stock is filtered at atmospheric pressure.

4. The process of purifying petrolatum comprising heating bauxite at a temperature between 600 and 1600° F. to thereby activate the same and filtering petrolatum at about 250° F. through said activated bauxite under a pressure in excess of atmopseric at which the yield of petrolatum is materially in excess of the yield when the same stock is filtered at atmospheric pressure.

5. The process of purifying petrolatum comprising filtering petrolatum at a temperature between 130 and 400° F. through activated bauxite under a pressure of at least 30 pounds per square inch in excess of atmospheric.

6. The process of purifying petrolatum comprising filtering petrolatum at about 250° F. through activated bauxite under a pressure of at least 30 pounds per square inch in excess of atmospheric.

7. The process of purifying petrolatum comprising heating bauxite to a temperature between 600 and 1600° F. to thereby activate the same and filtering petrolatum at a temperature between 130 and 400° F. through said activated bauxite under a pressure of at least 30 pounds per square inch in excess of atmospheric.

8. The process of purifying petrolatum comprising heating bauxite at a temperature between 600 and 1600° F. to thereby activate the same and filtering petrolatum at about 250° F. through said activated bauxite under a pressure of at least 30 pounds per square inch in excess of atmospheric.

FERDINAND W. BRETH.
ANTHONY KINSEL.